(12) United States Patent
Okuyama (10) Patent No.: US 9,434,164 B2
(45) Date of Patent: Sep. 6, 2016

(54) INK JET RECORDING APPARATUS

(71) Applicant: Seiko Epson Corporation, Tokyo (JP)

(72) Inventor: Tomoyuki Okuyama, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/823,175

(22) Filed: Aug. 11, 2015

(65) Prior Publication Data

US 2016/0046125 A1 Feb. 18, 2016

(30) Foreign Application Priority Data

Aug. 12, 2014 (JP) ................. 2014-164170

(51) Int. Cl.
*B41J 2/14* (2006.01)
*B41J 2/21* (2006.01)

(52) U.S. Cl.
CPC ......... *B41J 2/14233* (2013.01); *B41J 2/14201* (2013.01); *B41J 2/2107* (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 11/0015; B41J 11/002; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52

See application file for complete search history.

(56) References Cited

U.S. PATENT DOCUMENTS

| 6,494,566 | B1 * | 12/2002 | Kishino | B41J 2/14233 29/25.35 |
| --- | --- | --- | --- | --- |
| 6,502,929 | B1 | 1/2003 | Tanaka et al. | |
| 8,313,160 | B2 | 11/2012 | Matsuo | |
| 2007/0126803 | A1* | 6/2007 | Iriguchi | B41J 2/14209 347/68 |
| 2008/0151008 | A1* | 6/2008 | Fukugawa | B41J 2/14233 347/70 |
| 2012/0306977 | A1* | 12/2012 | Komatsu | C09D 11/106 347/100 |
| 2013/0127953 | A1* | 5/2013 | Furukawa | C09D 11/107 347/68 |

FOREIGN PATENT DOCUMENTS

JP 08-020107 1/1996

* cited by examiner

*Primary Examiner* — Geoffrey Mruk
(74) *Attorney, Agent, or Firm* — Harness, Dickey & Pierce, P.L.C.

(57) ABSTRACT

An ink jet recording apparatus according to the invention includes an ink, and a discharge head that discharges the ink, in which the discharge head includes a plurality of pressure chambers respectively communicating with a plurality of nozzle holes formed in a nozzle plate, a vibration plate changing the capacity of each of the plurality of pressure chambers, and an ink supply chamber for supplying the ink to the plurality of pressure chambers, the capacity of the pressure chamber is $10.0 \times 10^6$ $\mu m^3$ or less, the density in which the plurality of nozzle holes are arranged in the nozzle plate is 200 dpi or more, the ink includes a pigment, water, an organic solvent, and a resin component, a ratio (organic solvent/water) of a mass of the organic solvent to a mass of the water in the ink is 0.2 to 0.5, and a solid content of the resin component in the ink is 1.5 mass % or more.

12 Claims, 3 Drawing Sheets

INK JET RECORDING APPARATUS

BACKGROUND

1. Technical Field

The present invention relates to an ink jet recording apparatus.

2. Related Art

An ink jet type recording apparatus, which is an example of a liquid ejecting apparatus, includes a discharge head having a nozzle hole for discharging an ink, driving means that causes an ink to be discharged through the nozzle hole (for example, a piezoelectric vibrator, and a heating element), and control means that controls the driving means in accordance with data. A supply of an ink to the nozzle hole is performed by, for example, an ink cartridge, an ink supply chamber that receives an ink from the ink cartridge, and an ink supply channel that connects the ink supply chamber to the nozzle hole. The ink cartridge is commonly replaceable.

As an example of the discharge head, there is a discharge head that includes a nozzle plate provided with a nozzle hole, and a vibration plate disposed in parallel with the nozzle plate and vibrated by a piezoelectric element, and that discharges an ink by changing the volume of a pressure chamber formed between the nozzle plate and the vibration plate using vibration of the vibration plate (for example, JP-A-8-020107).

JP-A-8-020107 discloses that when the apparatus is placed in a low temperature environment, if an ink starts to become frozen from the nozzle plate side, and the freezing reaches the vibration plate, the vibration plate or the piezoelectric element may be damaged, and thus, an effort is made to suppress damage to the vibration plate or the piezoelectric element by adjusting the structure of the head, or a relative thermal capacity of a member to cause the ink to become frozen from the vibration plate side.

However, recently, definition required for an image of the ink jet recording apparatus has been highly increased, and the discharge head has been refined and densified in accordance with this increase. Therefore, it is difficult to prevent the damage or the like caused by the freezing of ink in the discharge head only by improving the structure or a material of the discharge head as the technology disclosed in JP-A-8-020107. In other words, it is difficult to make the temperature difference within the head due to miniaturization of the head, and it is difficult to control the freezing starting point of the ink.

SUMMARY

An advantage of some aspects of the invention is to provide an ink jet recording apparatus which includes a highly dense and miniaturized discharge head, and of which the discharge head is hardly damaged or the like, even when the apparatus is placed in a low temperature environment.

The invention can be realized in the following aspects or application examples.

Application Example 1

According to this application example, there is provided an ink jet recording apparatus including an ink, and a discharge head that discharges the ink, in which the discharge head includes a plurality of pressure chambers respectively communicating with a plurality of nozzle holes formed in a nozzle plate, a vibration plate changing the capacity of each of the plurality of pressure chambers, and an ink supply chamber for supplying the ink to the plurality of pressure chambers, the capacity of the pressure chamber is $10.0 \times 10^6$ μm$^3$ or less, and the density in which the plurality of nozzle holes are arranged in the nozzle plate is 200 dpi or more, and the ink includes a pigment, water, an organic solvent, and a resin component, a ratio (organic solvent/water) of a mass of the organic solvent to a mass of the water in the ink is 0.2 to 0.5, and a solid content of the resin component in the ink is 1.5 mass % or more.

In this case, the ink jet recording apparatus includes a highly dense and miniaturized discharge head, and the discharge head is hardly damaged due to the freezing of the ink, even when the apparatus is placed in a low temperature environment. In other words, in this ink jet recording apparatus, at least a part of volume expansion of water caused by solidification when the apparatus is placed in a low temperature environment is offset by volume contraction of the organic solvent, and a strong solid (ice) is hardly generated due to the presence of the resin component, and a sherbet-shaped (ice cream-shaped) solid is generated. According to this, it is possible to reduce stress which may damage the vibration plate or the piezoelectric element of the discharge head.

Application Example 2

In the ink jet recording apparatus according to Application Example 1, when the ink jet recording apparatus is cooled, and the ink is frozen, an ink of the nozzle plate side may be preferentially frozen to the ink of the vibration plate side within the pressure chamber.

Application Example 3

In the ink jet recording apparatus according to Application Example 1 or 2, the pressure chamber and the vibration plate may not be substantially in contact with the air outside.

Application Example 4

In the ink jet recording apparatus according to any one of Application Examples 1 to 3, the pigment may be dispersed using a resin dispersant, and the resin component may include the resin dispersant.

Application Example 5

In the ink jet recording apparatus according to any one of Application Examples 1 to 4, Young's modulus of a material configuring the vibration plate may be 250 Gpa or less.

Application Example 6

In the ink jet recording apparatus according to any one of Application Examples 1 to 5, the ink may include a resin emulsion as the resin component.

Application Example 7

In the ink jet recording apparatus according to any one of Application Examples 1 to 6, a flexible and elastic film may be included in a portion of a wall surface of the ink supply chamber.

In this case, even when the volume of the ink is expanded due to the freezing, it is possible to alleviate the stress generated by the expansion. According to this, even when the apparatus is placed in a low temperature environment, the damage to the discharge head caused by the freezing of the ink hardly occurs.

Application Example 8

In the ink jet recording apparatus according to any one of Application Examples 1 to 7, a volume expansion coefficient of the ink in a case where the ink is frozen under a temperature condition of −20° C. may be 3.3% to 6.4%.

Application Example 9

In the ink jet recording apparatus according to any one of Application Examples 1 to 8, the resin component may include a resin having Tg of 80° C. or less.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention are described in the following. The embodiments described below are examples of the invention. The invention is not limited at all to the following embodiments, and includes various modification embodiments in a scope not departing from the gist of the invention. In addition, the entirety of the configuration described below is not necessarily the essential configuration of the invention.

1. Ink Jet Recording Apparatus

Figure 1:
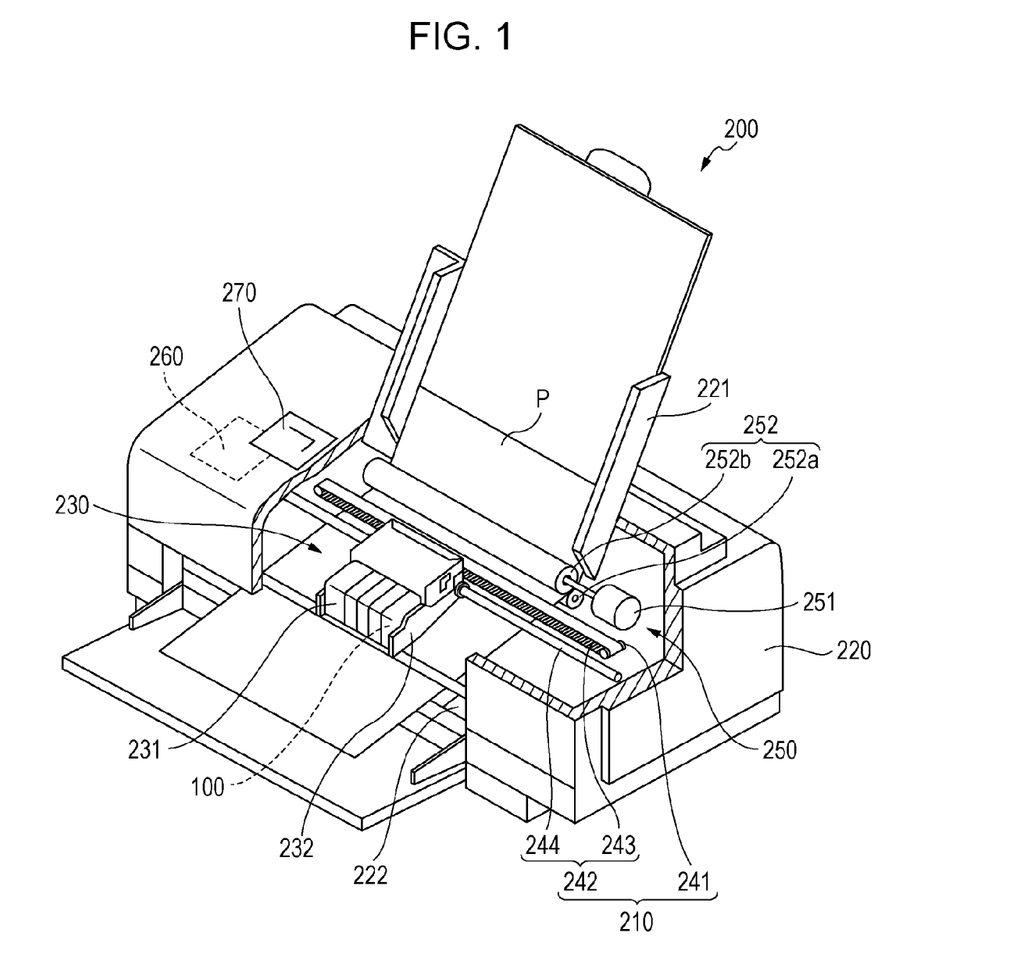
FIG. 1 is a partial cross-sectional perspective view of an ink jet recording apparatus according to an embodiment.

The ink jet recording apparatus according to the invention includes a discharge head discharging an ink. In the following, an ink jet recording apparatus 200 having the discharge head is exemplarily described, but the ink jet recording apparatus according to the invention is not limited to this embodiment. The ink jet recording apparatus of the invention is not limited to a shape or structure of the ink jet recording apparatus 200 to be exemplified, and it can be suitably configured Hereinafter, the ink jet recording apparatus 200 is described as one example. FIG. 1 is a perspective view schematically illustrating the ink jet recording apparatus 200 according to the embodiment.

The ink jet recording apparatus 200 includes a head unit 230, a driving unit 210, and a control unit 260 as illustrated in FIG. 1. Further, the ink jet recording apparatus 200 includes an apparatus main body 220, a paper feeding unit 250, a tray 221 in which a recording paper P is installed, a discharge port 222 for discharging the recording paper P, and an operation panel 270 disposed on an upper surface of the apparatus main body 220.

The head unit 230 has an ink jet type recording head (hereinafter, simply referred to as a "head" or a "discharge head") configured to include a discharge head 100 described below. The head unit 230 further includes an ink cartridge 231 supplying an ink to the head, and a carrying unit (carriage) 232 on which the head and the ink cartridge 231 are mounted.

The driving unit 210 can cause the head unit 230 to reciprocate. The driving unit 210 includes a carriage motor 241, which is a driving source of the head unit 230, and a reciprocating mechanism 242 which causes the head unit 230 to reciprocate by rotation of the carriage motor 241.

The reciprocating mechanism 242 includes a carriage guide shaft 244 of which both ends are supported by a frame (not illustrated), and a timing belt 243 extending in parallel with the carriage guide shaft 244. The carriage guide shaft 244 supports the carriage 232, while allowing the carriage 232 to reciprocate freely. Further, the carriage 232 is fixed to a portion of the timing belt 243. When an operation of the carriage motor 241 runs the timing belt 243, the head unit 230 reciprocates being guided by the carriage guide shaft 244. While the head unit reciprocates, an ink is discharged at a predetermined timing from the head, and printing is performed on the recording paper P.

In the embodiment, an example is illustrated in which printing is performed while both the discharge head 100 and the recording paper P are being moved, but the ink jet recording apparatus may include a mechanism in which printing is performed on the recording paper P while positions of the discharge head 100 and the recording paper P are being relatively changed. In addition, in the embodiment, an example in which printing is performed on the recording paper P is illustrated, but the recording medium on which printing can be performed by the ink jet recording apparatus of the invention is not limited to paper, and a wide range of mediums such as a cloth, a film, a metal or the like can be exemplified as the recording medium, and it is possible to change the configuration appropriately.

The control unit 260 can control the head unit 230, the driving unit 210, and the paper feeding unit 250. The paper feeding unit 250 can feed the recording paper P from the tray 221 to the head unit 230 side. The paper feeding unit 250 includes a paper feeding motor 251, which is a driving source of the paper feeding unit, and a paper feeding roller 252 rotated by an operation of the paper feeding motor 251. The paper feeding roller 252 includes a driven roller 252a and a driving roller 252b facing each other in the vertical direction with a feeding route of the recording paper P interposed therebetween. The driving roller 252b is connected to the paper feeding motor 251. When the paper feeding unit 250 is driven by the control unit 260, the recording paper P is fed so as to pass a position below the head unit 230. The head unit 230, the driving unit 210, the control unit 260, and the paper feeding unit 250 are provided inside the apparatus main body 220.

In addition, the exemplified ink jet recording apparatus 200 has one discharge head, and it can perform printing on the recording medium with this discharge head. However, the ink jet recording apparatus may have a plurality of discharge heads. In a case where the ink jet recording apparatus has a plurality of discharge heads, each of the plurality of discharge heads may be operated independently as described above, and the plurality of discharge heads may be connected to each other to form one assembled head. As this assembled head, for example, a line-type head in which all nozzle holes of the plurality of heads are arranged at uniform intervals can be exemplified.

The discharge head 100 mounted on the ink jet recording apparatus 200, and an ink is described below in order.

1.1. Discharge Head

The discharge head 100 of the embodiment includes a plurality of pressure chambers 20 respectively communicating with a plurality of nozzle holes 12 formed on a nozzle plate 10, a vibration plate 30 changing each capacity of the plurality of pressure chambers 20, and an ink supply chamber for supplying an ink to the plurality of pressure chambers 20.

Figure 2:
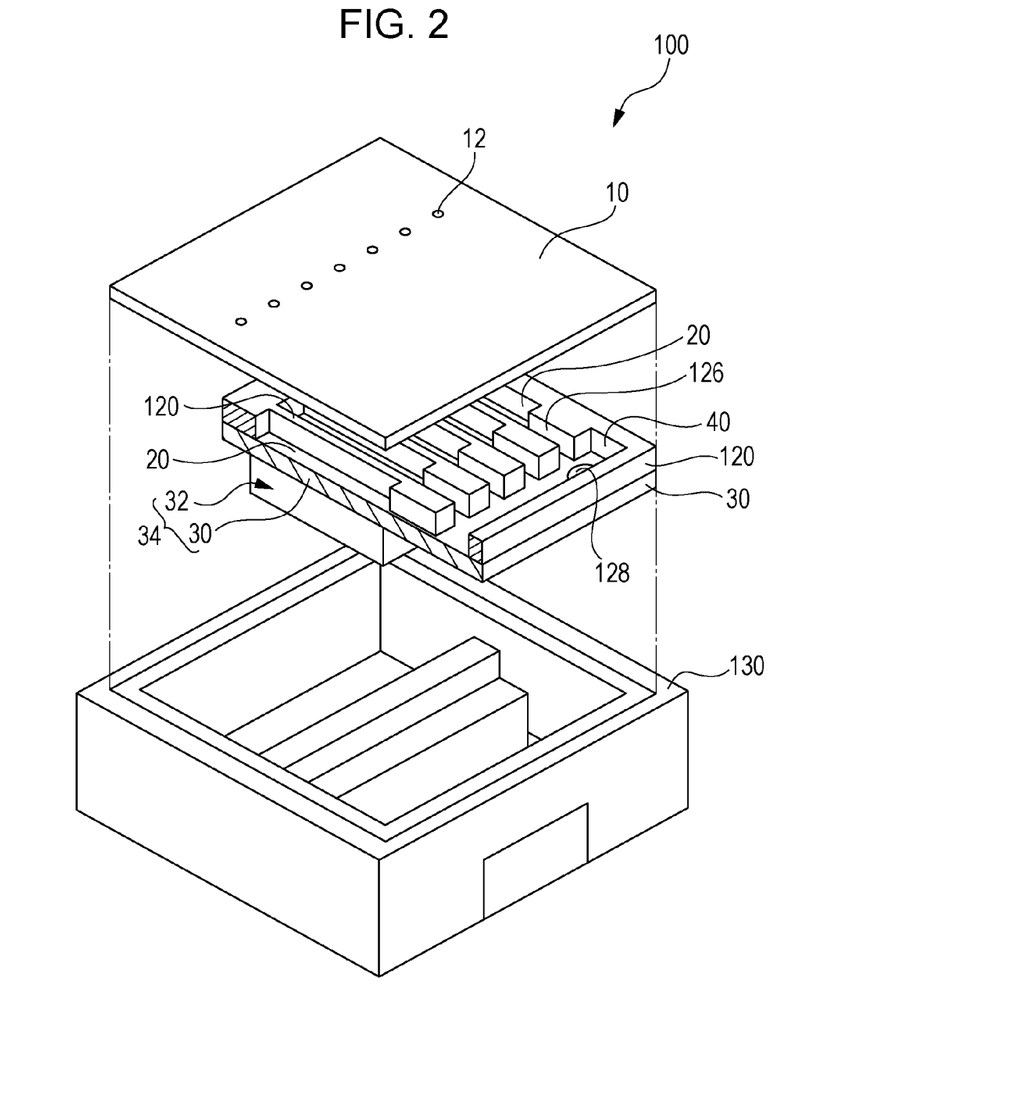
FIG. 2 is an exploded perspective view schematically illustrating a discharge head according to the embodiment.

FIG. 2 is a cross-sectional view schematically illustrating main parts of the discharge head 100 according to one example of the embodiment. FIG. 2 is an exploded perspective view of the discharge head 100, and illustrates the upside-down state of the discharge head mounted in the ink jet recording apparatus 200 illustrated in FIG. 1. The exemplified discharge head 100 has a piezoelectric element 32, and the piezoelectric element 32 is formed being in contact with the vibration plate 30. In addition, a piezoelectric actuator 34 is configured to include the piezoelectric element 32 and the vibration plate 30. In addition, the scale of each configuration is properly changed for convenience of descriptions in the drawings. In addition, FIG. 2 illustrates the simplified piezoelectric element 32.

The discharge head 100 includes the nozzle plate 10 having the nozzle hole 12, a pressure chamber substrate 120 for forming the pressure chamber 20, and the piezoelectric element 32 as illustrated in FIG. 2. Further, the discharge head 100 may have a housing 130 as illustrated in FIG. 2.

The nozzle plate 10 has the nozzle hole 12 as illustrated in FIG. 2. An ink can be discharged from the nozzle hole 12. A plurality of nozzle holes 12 is provided by being arranged on the nozzle plate 10. The number of nozzle holes 12 provided in the nozzle plate 10 is not particularly limited. In the discharge head 100 of the embodiment, a gap in which the nozzle holes 12 are arranged is 200 dpi or more. In other words, a gap between the arranged adjacent nozzle holes 12 is 127 µm or less. As a material of the nozzle plate 10, for example, silicon, a stainless steel (SUS) or the like can be exemplified. In addition, as a material of the nozzle plate 10, an alloy including iron (Fe) as a main component (50% or more), and chromium (Cr) in an amount of 10.5% or more is more preferable, since it is possible to obtain rigidness and rust resistance at the same time.

In the discharge head 100, the pressure chamber substrate 120 is provided being in contact with the nozzle plate 10. As a material of the pressure chamber substrate 120, for example, silicon or the like can be exemplified. The pressure chamber substrate 120 partitions a space between the nozzle plate 10 and the vibration plate 30, and thus the ink supply chamber 40 (a liquid storage unit), a supply port 126 communicating with the ink supply chamber 40, and the pressure chamber 20 communicating with the supply port 126 are formed as illustrated in FIG. 2.

In this example, the ink supply chamber 40, the supply port 126, and the pressure chamber 20 are described separately, but they are all liquid channels. As long as the pressure chamber 20 is formed, it does not matter how the channel is designed. In addition, for example, in the illustrated example, as the supply port 126, a portion of the channel is narrowed, but such an expansion or contraction of the channel can be arbitrarily made according to the design, and further it is necessarily not an essential configuration.

In addition, the pressure chamber 20 of the discharge head 100 indicates a space partitioned by the nozzle plate 10, the pressure chamber substrate 120, and the vibration plate 30, and a space not including the nozzle hole 12 and the supply port 126. In other words, the pressure chamber 20 is a space of which the capacity is changed according to a displacement of the vibration plate 30, and is defined as a space not including the narrowed channel communicating with the space or the like.

The ink supply chamber 40, the supply port 126, and the pressure chamber 20 are partitioned by the nozzle plate 10, the pressure chamber substrate 120, and the vibration plate 30. The ink supply chamber 40 can temporarily store the ink supplied through a through hole 128 provided in the vibration plate 30 from the outside (for example, an ink cartridge). The ink within the ink supply chamber 40 can be supplied to the pressure chamber 20 via the supply port 126. The capacity of the pressure chamber 20 changes according to the deformation of the vibration plate 30. The pressure chamber 20 communicates with the nozzle hole 12 and when the capacity of the pressure chamber 20 is changed, the ink is discharged from the nozzle hole 12, or introduced into the pressure chamber 20 from the ink supply chamber 40.

In the discharge head 100, the vibration plate 30 is provided being in contact with the pressure chamber substrate 120. The vibration plate 30 is deformed by an operation of the piezoelectric element 32, and it can change the internal pressure of the pressure chamber 20 by changing the capacity of the pressure chamber 20. In addition, in this example, the pressure chamber 20 is partitioned by the nozzle plate 10, the pressure chamber substrate 120, and the vibration plate 30. However, as long as the capacity of the pressure chamber 20 can be changed according to vibration of the vibration plate 30, it is possible to form the pressure chamber by proper members, and the number, the shape, the material or the like of the members for the pressure chamber are arbitrary.

In the discharge head 100, the piezoelectric element 32 is provided being in contact with the vibration plate 30. The piezoelectric element 32 is electrically connected to a piezoelectric element driving circuit (not illustrated), and it can be operated (vibrated or deformed) based on a signal of the piezoelectric element driving circuit. As the piezoelectric element 32, it is not particularly limited, and for example, a type of an element (an electromechanical conversion element) which is deformed by an application of a voltage can be exemplified. In the specification, a combination of a portion of the vibration plate 30 partitioning the pressure chamber 20, and the piezoelectric element 32 provided in the portion may be referred to as the piezoelectric actuator 34. In addition, the vibration plate 30 may be integrally provided with electrodes (for example, formed by Pt or the like) configuring the piezoelectric element 32.

In the discharge head 100 of the embodiment, since a gap between the nozzle holes 12 is 127 µm or less, the piezoelectric element 32 is preferably configured so that a piezoelectric material is disposed between the two electrodes. In other words, the piezoelectric actuator 34 preferably has a thin film form in which one electrode, a layer of the piezoelectric material (for example, PZT (lead zirconate titanate)), and another electrode are sequentially laminated overall, with respect to the vibration plate 30. In addition, the volume (the capacity) of the pressure chamber 20 is $10.0 \times 10^6$ µm$^3$ or less.

A material of the vibration plate 30 is not particularly limited, and for example, a laminate of layers formed of silicon oxide (SiO$_2$), silicon nitride (SiN), silicon oxide nitride (SiON), zirconium oxide (ZrO$_2$), titanium oxide (TiO$_2$), silicon carbide (SiC), and these materials or the like can be exemplified. As a material of the vibration plate 30, a material having Young's modulus of 250 Gpa or less is more preferable from a viewpoint that the vibration plate is greatly displaced, and damage hardly occurs. For example, it is more preferable to form the vibration plate including ZrO$_2$ (150 GPa), SiO$_2$ (75 GPa), Si (130 GPa), SUS (199 GPa), or Cr (248 GPa) (numbers within the parenthesis refer to Young's modulus). In addition, in a case where the electrodes of the piezoelectric element 32 are formed by Pt, and integrally laminated with the vibration plate 30, since Young's modulus of Pt is 168 GPa, and Young's modulus of ZrO$_2$ is 150 GPa, the vibration plate may be configured as described above because the Young's modulus is 250 GPa or less even when they are combined.

In addition, in the specification, the Young's modulus refers to Young's modulus measured in a static test (JIS G0567J or the like)(mechanical test), and for example, the Young's modulus is measured by using for example, No. II-6 specimen.

The housing 130 can accommodate the nozzle plate 10, the pressure chamber substrate 120, and the piezoelectric element 32 as illustrated in FIG. 2. As a material of the housing 130, for example, a resin, a metal or the like can be exemplified. The housing 130 may have a function of separating the piezoelectric element 32 from the outside environment. In addition, an inert gas or the like may be sealed in the housing 130, or the pressure inside the housing 130 may be reduced. According to this, it is possible to suppress deterioration or the like of the piezoelectric material. In addition, the housing 130 is a cover covering the piezoelectric element 32, but a cover (not illustrated) may be provided separately from the housing 130. In this case, the housing 130 may function as a supporting body of the discharge head 100.

Figure 3:
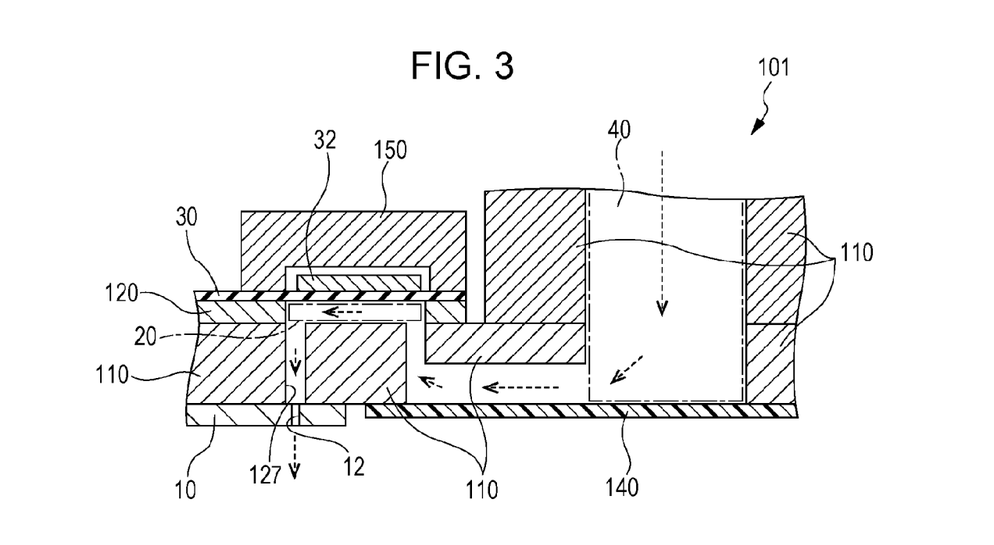
FIG. 3 is a cross-sectional schematic diagram of the main parts of the discharge head according to the embodiment.
Figure 4:
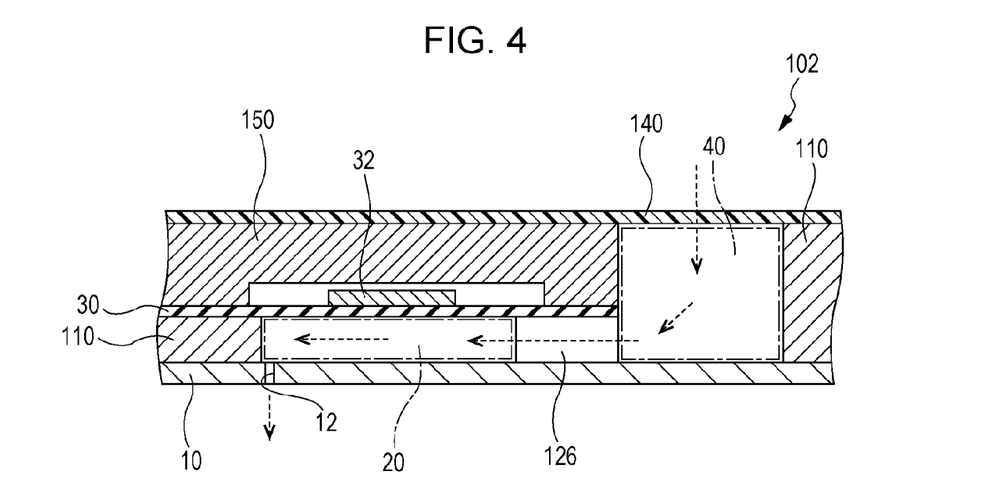
FIG. 4 is a cross-sectional schematic diagram of the main parts of the discharge head according to the embodiment.

FIGS. 3 and 4 are cross-sectional schematic diagrams of main parts of a discharge head 101 and a discharge head 102 according to another example of the embodiment. In the description of the discharge head 101 and the discharge head 102, the same reference numerals are used for the members having the same functions as in the discharge head 100 described above, and the detailed description is omitted.

Each of the discharge head 101 and the discharge head 102 illustrated in FIGS. 3 and 4 includes the plurality of pressure chambers 20 respectively communicating with a plurality of nozzle holes 12 formed in the nozzle plate 10, the vibration plate 30 changing each capacity of the plurality of pressure chambers 20, and the ink supply chamber 40 supplying an ink to the plurality of pressure chambers 20.

FIGS. 3 and 4 schematically illustrate a flow of the ink from the ink supply chamber 40 to the nozzle hole 12 when an operation of discharging the ink is performed with dashed line arrows. A discharge port 127 is formed in the discharge head 101 illustrated in FIG. 3, and the pressure chamber 20 indicates a space partitioned by a channel formation substrate 110, the pressure chamber substrate 120, and the vibration plate 30, and a space not including the nozzle hole 12, the discharge port 127, and the supply port 126. In addition, in the discharge head 102 illustrated in FIG. 4, the pressure chamber 20 indicates a space partitioned by the nozzle plate 10, the pressure chamber substrate 120, and the vibration plate 30, and a space not including the nozzle hole 12 and the supply port 126. In other words, as in the description of the discharge head 100 described above, in the discharge head 101 and the discharge head 102, the pressure chamber 20 is a space of which the capacity is changed according to a displacement of the vibration plate 30, and is defined as a space not including the narrowed channel communicating with the space or the like. In both the discharge head 101 and the discharge head 102, the capacity of the pressure chamber 20 is $10.0 \times 10^6$ μm$^3$ or less, and the density of the arrangement of the nozzle hole 12 is 200 dpi or more.

In the discharge head 101 and the discharge head 102, a compliance sheet 140 is used as a member forming a portion of the ink channel. The compliance sheet 140 is a flexible and elastic film. As long as the compliance sheet 140 is an elastic film, the compliance sheet is not particularly limited, and for example, a polymer film, a thin metal film, a glass fiber, a carbon fiber or the like can be exemplified. A material of the polymer film is not particularly limited, and polyimide, nylon, polyolefin, polyphenylene sulfide or the like can be exemplified. In addition, as the metal, for example, materials including iron or aluminum can be exemplified.

The thickness of the compliance sheet 140 is not particularly limited, and for example, 50 μm or less is preferable, 20 μm or less is more preferable, 1 μm to 10 μm is still more preferable. It is more preferable to form the compliance sheet 140 with polyphenylene sulfide. When the compliance sheet 140 is too thin, a vibration occurs considerably at the time of discharging the ink, and residual vibration may occur frequently. The compliance sheet 140 has a function of a damper for discharging or distributing the ink. In a case where the volume of the ink is expanded, the compliance sheet 140 suppresses damage to the discharge heads 101 and 102 by its deformation.

Both the discharge head 101 and the discharge head 102 have a cover 150. The cover 150 is configured as a member separate from the housing (not illustrated). The cover 150 is provided being in contact with the vibration plate 30, forms a space for accommodating the piezoelectric element 32, and accommodates the piezoelectric element 32 in the space. A material of the cover 150 is the same as the material of the housing 130 described above. The cover 150 may have a function of separating the piezoelectric element from the outside environment, an inert gas or the like may be sealed in the space formed by the cover 150, or the pressure inside the space may be reduced. According to this, it is possible to suppress deterioration or the like of the piezoelectric material of the piezoelectric element 32.

In a case where any one of the discharge heads 100, 101, and 102 of the embodiment exemplified in the above is mounted in the ink jet recording apparatus, the nozzle plate 10 is disposed to face the recording paper P, and the nozzle plate 10 is in direct contact with the air (air outside). Meanwhile, in a case where the discharge heads 100, 101, and 102 of the embodiment have the housing 130 or the cover 150, the piezoelectric element 32 and the vibration plate 30 are not substantially in contact with the air outside.

The ink jet recording apparatus is used with the ink introduced into the discharge head. The ink jet recording apparatus is commonly used being installed in an environment having a temperature close to room temperature. In a case where the ink jet recording apparatus is installed in a cold area, or in a case where an air conditioning device in the installation environment fails, the temperature of the air outside may be low (for example, 0° C. or less). In such a low temperature environment, in a case where the ink is an ink based on water, the ink in the discharge head may become frozen, and the discharge head may be damaged by the volume expansion of the ink caused by the freezing or the generation of ice. In particular, in the discharge head of the embodiment, since the nozzle plate is configured to be in direct contact with the air outside, the ink starts to become frozen from the vicinity of the nozzle plate within the channels in many cases. Thus, ice crystals become bigger, as it moves further away from the nozzle plate, and the piezoelectric element or the vibration plate are easily damaged. In other words, when the ink jet recording apparatus of the embodiment is cooled, and the ink is frozen, the ink of the nozzle plate side is preferentially frozen to the ink of the vibration plate side within the pressure chamber of the discharge head.

In addition, in the discharge head of the embodiment, since the volume of the pressure chamber 20 is $10.0 \times 10^6$ µm$^3$ or less, the density of the arrangement of the nozzle hole 12 is 200 dpi or more, and the piezoelectric actuator 34, which is a thin film, is included, the piezoelectric element or the vibration plate is easily damaged due to the freezing of the ink. Further, in a case where the discharge head has the housing or the cover, a tendency in which the ink starts to become frozen from the nozzle plate side in the ink channel becomes remarkable.

Here, the ink jet recording apparatus of the embodiment uses the ink described below. According to this, damage to the discharge head is suppressed. In addition, although the ink includes water as a component, it is possible to suppress the damage to the discharge head. In the following, the ink is described.

1.2 Ink

The ink jet recording apparatus 200 of the embodiment discharges an ink described below using the discharge head described above. The ink of the embodiment includes a pigment, water, an organic solvent, and a resin component. In addition, a ratio (organic solvent/water) of a mass of the organic solvent to a mass of water in the ink is 0.2 to 0.5, and a solid content of the resin component in the ink is 1.5 mass % or more. Hereinafter, the pigment, water, organic solvent, and resin component are sequentially described in detail.

1.2.1 Pigment

The ink includes a pigment. As the pigment, it is not particularly limited, and various color pigments such as magenta, cyan, green, and yellow pigment, white pigments, bright pigments, or the like, which are generally used for an ink can be exemplified.

A content of the pigment (in terms of a solid content) is preferably 0.1 mass % to 20 mass % with respect to the total mass of the ink, and more preferably 1 mass % to 15 mass %. By setting the content of the pigment within the range described above, it is easy to obtain the ink having excellent dispersibility, and an image having excellent color development.

As the magenta pigment, for example, C.I. Pigment red 1 (Para Red), 2, 3 (Toluidine Red), 5 (ITR Red), 7, 9, 10, 11, 12, 17, 30, 31, 38 (Pyrazolone Red), 42, 48 (Ca), 48 (Mn), 57 (Ca), 57:1, 88 (Thioindigo), 112 (Naphthol AS series), 122 (dimethylquinacridone), 123, 144, 149, 150, 166, 168 (Anthanthrone Orange), 170 (Naphthol AS series), 171, 175, 176, 177, 178, 179 (Perylene maroon), 184, 185, 187, 202, 209 (Dichloroquinacridone), 219, 224 (Perylene series), 245 (Naphthol AS series), C.I. Pigment violet 19 (Quinacridone), 23 (Dioxazine violet), 32, 33, 36, 38, 43, or the like can be exemplified, and at least one type thereof can be used.

As the cyan pigment, for example, C.I. Pigment blue 1, 2, 3, 15, 15:1, 15:2, 15:3, 15:4, 16 (Metal-free Phthalocyanine), 18 (Alkali blue toner), 22, 25, 60 (Threne blue), 65 (Violanthrone), 66 (Indigo) or the like can be exemplified, and at least one type thereof can be used.

As the green pigment, C.I. Pigment green 7 (Phthalocyanine green), 10 (Green gold), 36, 37, 58 or the like can be exemplified, and at least one type thereof can be used.

As the yellow pigment, for example, at least one type of C.I. Pigment yellow 1 (Hansa yellow), 2, 3, 12, 13, 14, 16, 17, 24 (Flavanthrone yellow), 34, 35, 37, 53, 55, 65, 73, 74, 75, 81, 83 (Diarylide yellow), 93, 94, 95, 97, 98, 99, 108 (Anthrapyrimidine yellow), 109, 110, 111, 113, 114, 117 (Copper complex salts pigment), 120, 128, 129, 133 (Quinophthalone), 138, 139 (Isoindolinone), 147, 150, 151, 153 (Nickel complex pigment), 154, 155, 167, 172, 180, 185, and 213 can be used.

As the black pigment, carbon black, iron oxide, and titanium dioxide can exemplified. As the carbon black, it is not particularly limited, and for example, furnace black, lamp black, acetylene black, and channel black (C.I. Pigment black 7) can be exemplified. As the carbon black, a commercially available product can be used. For example, No. 2, 300, 900, MCF88, No. 20B, No. 33, No. 40, No. 45, No. 52, MA7, MA8, MA100, No. 2200B, color black FW1, FW2, FW2V, FW18, FW200, 5150, 5160, 5170, PRITECS35, U, V, 140U, special black 6, 5, 4A, 4, 250 (all of the above are trade names, manufactured by Degussa GmbH), Conductex SC, RAVEN 1255, 5750, 5250, 5000, 3500, 1255, 700 (all of the above are trade names, manufactured by Columbia Carbon), REGAL 400R, 330R, 660R, MOGUL L, MONARCH 700, 800, 880, 900, 1000, 1100, 1300, 1400, and Elftex 12 (all of the above are trade names, manufactured by Cabot Corporation) can be exemplified.

As the white pigment, particles using at least one type of a compound selected from metal oxides (for example, titanium dioxide, zinc oxide, silica, alumina, magnesium indium oxide, antimony oxide, tin oxide, barium titanate or the like), barium sulfate, and calcium carbonate as a main component can be exemplified. At least one type of the white pigment may be used singly, or two or more types thereof may be used in combination.

As the white pigment, a commercially available product may be used, for example, TTO-51(A), TTO-51(C), TTO-55(A), TTO-55(B), TTO-55(C), and TTO-55(D) manufactured by ISHIHARA SANGYO KAISHA, LTD, MT-700B, JR-301, JR-403, JR-405, JR-600A, JR-605, JR-600E, JR-603, JR-805, JR-806, JR-701, JRNC, JR-800, JR, JA-1, JA-C, and JA-3 (all of the above are trade names) manufactured by TAYCA CORPORATION or the like can be exemplified.

The bright pigment is not particularly limited, as long as the pigment exhibits brightness when it is adhered to the recording medium. However, for example, at least one type or an alloy of two or more types (referred to as a metal pigment) selected from a group consisting of aluminium, silver, gold, platinum, nickel, chromium, tin, zinc, indium, titanium, copper, and the like can be exemplified. In addition, when the bright pigment has a scale-like shape (flat plate shape), the bright pigment easily exhibits brightness when being adhered to the medium, which is preferable. Further, the bright pigment including a material (for example, aluminium) which may react with water may be surface-treated in order to suppress a reaction with water.

1.2.2. Water

The ink of the embodiment includes water. In the ink of the embodiment, water is a main solvent. In other words, water is included in an amount of 50 mass % or more with respect to the total amount of the ink. As water, pure water such as ion exchange water, ultra-filtrated water, reverse osmotic water, distilled water or the like, or ultra pure water can be used. In addition, by using water sterilized by ultraviolet irradiation, hydrogen peroxide or the like, it is possible to prevent mold or bacteria from being generated in a case where the ink composition is stored for a long period of time, which is preferable.

When the ink of the embodiment is frozen, the freezing of water causes a volume expansion. More specifically, when water in the ink is frozen, the volume of the water is increased by about 10%. In the ink of the embodiment, a volume expansion of water caused by the freezing is offset by a volume contraction of the organic solvent, and thus the volume expansion of the entire ink is suppressed. By changing the properties of ice with a resin component, damage to the vibration plate or the piezoelectric element of the discharge head is suppressed.

From this viewpoint, a ratio of the organic solvent described below to water in the ink of the embodiment is designed. Specifically, a ratio of a mass of the organic solvent to a mass of the water in the ink (organic solvent/water) is 0.2 to 0.5. In addition, as a value of the ratio, 0.2 to 0.45 is preferable, and 0.25 to 0.4 is more preferable. By setting the ratio as the above, it is possible to set the volume expansion coefficient of the ink, in a case where the ink is frozen under a temperature condition of −20° C. within a range of 3.3% to 6.4%.

1.2.3 Organic Solvent

The ink of the embodiment includes an organic solvent. The ink may include various types of the organic solvent. In the ink, it is preferable that the organic solvent becomes frozen later than water when a temperature is decreased. Therefore, as a melting point of the organic solvent, −5° C. or less is preferable, and −10° C. or less is more preferable.

As the organic solvent, it is not particularly limited, and for example, 1,2-alkanediols, polyalcohols, pyrrolidone derivatives, lactone, glycol ethers or the like can be exemplified.

As the 1,2-alkanediols, for example, 1,2-propanediol, 1,2-butanediol, 1,2-pentanediol, 1,2-hexanediol, 1,2-octanediol or the like can be exemplified. Since the 1,2-alkanediols are excellent in wetting a recording medium uniformly by increasing the wettability of the ink with respect to the recording medium, an image having excellent adhesive properties on the recording medium may be formed. In a case where the ink includes 1,2-alkanediols, it is possible to set a content of the 1,2-alkanediols to 1 mass % to 20 mass % with respect to the total mass of the ink.

As the polyalcohols, for example, ethylene glycol, diethylene glycol, triethylene glycol, propylene glycol, dipropylene glycol, 1,3-propanediol, 1,4-butanediol, 1,5-pentanediol, 1,6-hexanediol, trimethylolpropane, glycerin or the like can be exemplified. The polyalcohols can be preferably used from a viewpoint of suppressing drying and solidification of the ink and reducing clogging, discharge failure or the like in a nozzle surface of a recording head of the ink jet recording apparatus. In a case where the ink includes the polyalcohols, it is possible to set a content of the polyalcohols to 2 mass % to 20 mass % with respect to the total mass of the ink.

As the pyrrolidone derivatives, for example, N-methyl-2-pyrrolidone, N-ethyl-2-pyrrolidone, N-vinyl-2-pyrrolidone, 2-pyrrolidone, N-buthyl-2-pyrrolidone, 5-methyl-2-pyrrolidone, 1-(2-hydroxyethyl)-2-pyrrolidone or the like can be exemplified. The pyrrolidone derivatives can act as a preferable solvent of the resin component. In a case where the ink includes the pyrrolidone derivatives, it is possible to set a content of the pyrrolidone derivatives to 0.5 mass % to 10 mass % with respect to the total mass of the ink.

In the invention, the "lactone" refers to a cyclic compound having an ester group (—CO—O—) in the ring. As the lactone, as long as it falls under the definition described above, it is not particularly limited, and the lactone having a carbon number of 2 to 9 is preferable. As specific examples of this lactone, α-ethyl lactone, α-acetolactone, β-propiolactone, γ-butyrolactone, δ-valerolactone, ε-caprolactone, ζ-enantiolactone, η-caprylolactone, γ-valerolactone, γ-heptalactone, γ-nonalactone, β-methyl-δ-valerolactone, 2-buthyl-2-ethylpropiolactone, α,α-diethylpropiolactone or the like can be exemplified, and among the above, γ-butyrolactone is particularly preferable. In a case where the recording medium is a film of a vinyl chloride resin or the like, the lactone causes the ink to infiltrate into the inside of the recording medium, thereby increasing the adhesive properties. It is possible to set the content of the lactone to 5 mass % to 30 mass % with respect to the total mass of the ink.

As the glycol ethers, for example, ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, tetraethylene glycol monobutyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether or the like can be exemplified. Among the above, one type can be used singly, or two or more types can be used in combination. The glycol ethers can suppress wettability or an infiltration rate of the ink with respect to the recording medium. Therefore, it is possible to record a clear image having little gradation unevenness. In a case where a water-based ink is used, and the ink includes glycol ethers, it is possible to set a content of the glycol ethers to 0.05 mass % to 40 mass % with respect to the total mass of the ink.

The volume of the organic solvent is reduced along with a decrease in temperature. In the ink of the embodiment, an increase of the volume caused when water in the ink is frozen is absorbed by a reduction of the volume of the organic solvent, and an increase of the entire volume of the ink is suppressed. From this viewpoint, a ratio of an organic solvent described below to water in the ink of the embodiment is designed. Specifically, a ratio of a mass of the organic solvent to a mass of the water in the ink (organic solvent/water) is 0.2 to 0.5. In addition, as a value of the ratio, 0.2 to 0.45 is preferable, and 0.25 to 0.4 is more preferable. By setting the ratio as the above, it is possible to set the volume expansion coefficient of the ink, in a case where the ink is frozen under a temperature condition of −20° C. within a range of 3.3% to 6.4%.

1.2.4 Resin Component

The ink of the embodiment includes a resin component. As the resin component, a type of a resin improving physical strength such as abrasion resistance of an image to be recorded (may be referred to as a fixing resin), a resin adjusting viscosity of the ink as a thickener, a type of a resin dispersing the pigment or the like can be exemplified.

As a more specific resin component included in the ink of the embodiment, well known resins such as an acrylic-based resin, a styrene acrylic-based resin, a fluorene-based resin, a urethane-based resin, a polyolefin-based resin, a rosin modified resin, a terpene-based resin, a polyester-based resin, a polyamide-based resin, an epoxy-based resin, a vinyl chloride-based resin, a vinyl chloride-vinyl acetate copolymer, and an ethylene acetic acid vinyl-based resin; polyolefin wax, or the like can be exemplified. One type of the resin can be used singly, or two or more types thereof can be used in combination. In addition, among the exemplified resins, the styrene acrylic-based resin, the polyester-based resin, and the polyolefin wax can be preferably used.

As the polyester-based resin, a commercially available product can be used. For example, Eastek 1100, 1300, 1400 (all of the above are trade names, manufactured by Eastman Chemical Company), elitel KA-5034, KA-3556, KA-1449, KT-8803, KA-5071S, KZA-1449S, KT-8701, KT9204 (all of the above are trade names, manufactured by UNITIKA LTD) or the like can be exemplified.

As the styrene acrylic-based resin, for example, a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer or the like can be exemplified. In addition, as an aspect of the copolymer, any aspects of a random copolymer, a block copolymer, an alternating copolymer, and a graft copolymer can be used. In addition, as the styrene acrylic-based resin, a commercially available product may be used. As the commercially available product of the styrene acrylic-based resin, JONCRYL 62J (manufactured by BASF Japan Ltd.) or the like can be exemplified.

As the polyolefin wax, it is not particularly limited, and for example, a wax manufactured from olefin such as ethylene, propylene, butylene or the like, or derivatives thereof; and a copolymer thereof, specifically, a polyethylene-based wax, a polypropylene-based wax, a polybutylene-based wax or the like can be exemplified. Among the above, from a viewpoint of reducing generation of cracks of an image, the polyethylene-based wax is preferable. One type of the polyolefin wax can be used singly, or two or more types thereof can be used in combination.

As a commercially available product of the polyolefin wax, CHEMIPEARL series such as "CHEMIPEARL W4005" (manufactured by Mitsui Chemicals, Inc., polyethylene-based wax, particle diameter of 200 nm to 800 nm, softening point of 110° C. by a ring and ball method, hardness of 3 by a penetration method, solid content of 40%) or the like can be exemplified. In addition to the above, AQUACER series such as AQUACER 513 (polyethylene-based wax, particle diameter of 100 nm to 200 nm, melting point of 130° C., solid content of 30%), AQUACER 507, AQUACER 515, AQUACER 539, and AQUACER 593, AQUACER 840 (all of the above are manufactured by BYK Japan KK), Hitech series such as Hitech E-7025P, Hitech E-2213, Hitech E-9460, Hitech E-9015, Hitech E-4A, Hitech E-5403P, and Hitech E-8237 (all of the above are manufactured by TOHO Chemical Industry Co., Ltd), Nopcoat PEM-17 (manufactured by SAN NOPCO LIMITED, polyethylene emulsion, particle diameter of 40 nm) or the like can be exemplified. These are commercially available in the form of a water-based emulsion in which a polyolefin wax is dispersed in water by a common method.

In addition, as the resin component imparting viscosity to the ink, for example, polyvinyl alcohols, poly(meth)acrylic acids, polyethers, polyvinyl pyrrolidones, polyvinyl formals, proteins (for example, gelatin, casein, glue or the like), polysaccharides (for example, pullulan, dextran, dextrin, cyclodextrine, carrageenan, pectin, glucomannan, sodium alginate, xanthan gum, arabic gum, locust bean gum, tragacanth gum, guar gum, tamarind gum or the like), starches (for example, starch, oxidized starch, carboxyl starch, dialdehyde starch or the like), cellulose or derivatives thereof (for example, methyl cellulose, ethyl cellulose, carboxymethyl cellulose, hydroxyethyl cellulose, hydroxypropyl cellulose, hydroxypropylmethyl cellulose or the like), an alginate salt (for example, sodium alginate, potassium alginate, ammonium alginate or the like), alginate (for example, propylene glycol alginate or the like) or the like can be exemplified.

In addition, as the resin component improving dispersibility of the pigment in the ink (in the specification, referred to as a "dispersion resin"), it is not particularly limited, and a resin having a weight average molecular weight of 70,000 to 100,000 can be exemplified. As the ink includes this dispersion resin, dispersion stability of the pigment in the ink becomes preferable, and it is possible to suppress coagulation of the pigment.

When the weight average molecular weight of the dispersion resin is equal to or more than the lower limit described above, an effect of suppressing infiltration of the pigment into the inside of the paper is easily exhibited on plain paper or matte paper. When the weight average molecular weight thereof is equal to or less than the upper limit, an effect of enhancing the dispersion stability of the pigment is easily exhibited. In addition, for example, the weight average molecular weight is measured by gel permeation chromatography (GPC) using tetrahydrofuran as a solvent, and it can be obtained by the molecular weight in terms of polystyrene.

As this dispersion resin, for example, polyvinyl alcohols, polyvinyl pyrrolidones, poly(meth)acrylic acids, a (meth) acrylic acid-acrylnitrile copolymer, a vinyl acetate-(meth) acrylic acid copolymer, a vinyl acetate-(meth)acrylate copolymer, a (meth)acrylic acid-(meth)acrylate copolymer, a styrene-(meth)acrylic acid copolymer, a styrene-(meth) acrylic acid-(meth)acrylate copolymer, a styrene-α-methylstyrene-(meth)acrylic acid copolymer, a styrene-α-methylstyrene-(meth)acrylic acid-(meth)acrylate copolymer, a styrene-maleic acid copolymer, a styrene-maleic anhydride copolymer, a vinylnaphthalene-(meth)acrylic acid copolymer, a vinylnaphthalene-maleic acid copolymer, a vinyl acetate-maleate copolymer, a vinyl acetate-crotonic acid copolymer and salts thereof, or the like can be exemplified. In addition, in the specification, a description of (meth) acrylic acid indicates acrylic acid or methacrylic acid. As an aspect of the copolymer, any aspects of the random copolymer, the block copolymer, the alternating copolymer, and the graft copolymer can be used.

As the salts thereof, salts with basic compounds such as ammonia, ethylamine, diethylamine, triethylamine, propylamine, isopropylamine, dipropylamine, butylamine, isobutylamine, diethanolamine, triethanolamine, tri-iso-propanolamine, aminomethyl propanol, morpholine or the like can be exemplified.

As the dispersion resin exemplified above, one type of the material described above may be used singly, or two or more types thereof may be used in combination.

As the fixing resin, similar to the dispersion resin, a water-soluble polyurethane is particularly preferable. As the preferable specific example of the water-soluble polyurethane resin, NeoRezR-960 (manufactured by AstraZeneca), NeoRezR-989 (manufactured by AstraZeneca), NeoRezR-9320 (manufactured by AstraZeneca), NeoRadNR-440 (manufactured by AstraZeneca), HYDRAN AP-30 (manufactured by DIC Corporation), HYDRAN APX-601 (manufactured by DIC Corporation), HYDRAN SP-510 (manufactured by DIC Corporation), HYDRAN SP-97

(manufactured by DIC Corporation), ELASTRON MF-60 (manufactured by DKS Co., Ltd), ELASTRON MF-9 (manufactured by DKS Co., Ltd), M-1064 (manufactured by DKS Co., Ltd), Izelax S-1020 (manufactured by Hodogaya Chemical Co., Ltd), Izelax S-1040 (manufactured by Hodogaya Chemical Co., Ltd), Izelax S-1085C (manufactured by Hodogaya Chemical Co., Ltd), Izelax S-4040N (manufactured by Hodogaya Chemical Co., Ltd), NEOTAN UE-5000 (manufactured by TOGASEI CO., LTD), RU-40 series (manufactured by Style Japan), U-COAT UWS-145 (manufactured by Sanyo Chemical industries, Ltd), PERMARIN UA-150 (manufactured by Sanyo Chemical industries, Ltd), WF-series (manufactured by Style Japan), and WPC-101 (manufactured by Nippon Polyurethane Industry Co., Ltd) can be exemplified.

The resin component described above is blended with the ink of the embodiment as a solid content in an amount of 1.5 mass % or more with respect to the total mass of the ink, regardless of a function or the type of the resin component. According to this, the ice (ice crystal) formed by the freezing of water in the ink can be more refined, and softened. According to this, when the ink is frozen, since it is possible to form a so-called sherbet shape, it is possible to contribute to suppressing damage to the vibration plate or piezoelectric element of the discharge head described above.

In addition, as the resin component, a resin having high softness is preferably used, and a resin having a glass transition temperature (Tg) of 80° C. or less, preferably 75° C. or less, more preferably 50° C. or less is preferably used.

1.2.5 Other Components

The ink of the embodiment may include components such as a surfactant, a solid moisturizing agent, a pH adjuster, a preservative, a fungicide, a rust-preventative agent, a chelating agent, a dye or the like, in addition to the components described above.

The surfactant have a function of decreasing surface tension and improving wettability with respect to a recording medium. Among the surfactants, for example, an acetylene glycol-based surfactant, a silicone-based surfactant, and a fluorine-based surfactant can be preferably used.

As the acetylene glycol-based surfactant, it is not particularly limited, and for example, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (all of the above are trade names, manufactured by Air Products and Chemicals. Inc.), Olfine B, Y, P, A, STG, SPC, E1004, E1006, E1008, E1010, PD-001, PD-002W, PD-003, PD-004, EXP.4001, EXP.4036, EXP.4051, EXP.4300, AF-103, AF-104, AK-02, SK-14, AE-3 (all of the above are trade names, manufactured by Nissin Chemical Co., Ltd), Acetylenol E00, E00P, E40, and E100 (all of the above are trade names, manufactured by Kawaken Fine Chemicals Co., Ltd) can be exemplified.

As the silicone-based surfactant, it is not particularly limited, and a polysiloxane-based compound can be preferably exemplified. As the polysiloxane-based compound, it is not particularly limited, and for example, a polyether modified organosiloxane can be exemplified. As a commercially available product of the polyether modified organosiloxane, for example, BYK-306, BYK-307, BYK-333, BYK-341, BYK-345, BYK-346, BYK-348, BYK-349 (all of the above are trade names, manufactured by BYK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of the above are trade names, manufactured by Shin-Etsu Chemical Co., Ltd) can be exemplified.

As the fluorine-based surfactant, a fluorine modified polymer is preferably used, and as a specific example, BYK-340 (manufactured by BYK Japan KK) can be exemplified.

When the ink includes a surfactant, a content thereof is preferably 0.1 mass % to 1.5 mass % with respect to the total mass of the ink.

An agent having a melting point of 20° C. or more, and solubility to water of 5 mass % or more at 20° C. corresponds to the solid moisturizing agent. Specifically, alcohols such as 1,4-butanediol, 2,3-butanediol, 2-ethyl-2-(hydroxymethyl)-1,3-propandiol or the like, esters such as ethylene carbonate or the like, nitrogen compounds such as acetamide, N-methyl acetamide, 2-pyrrolidone, $\epsilon$-caprolactam, urea, thiourea, N-ethyl urea or the like, and saccharides such as dihydroxyacetone, erythritol, D-arabinose, L-arabinose, D-xylose, 2-deoxy-$\beta$-D-ribose, D-lyxose, L-lyxose, D-ribose, D-arabitol, ribitol, D-altrose, D-allose, D-galactose, L-galactose, D-quinovose, D-glucose, D-digitalose, D-digitoxose, D-cymarose, L-sorbose, D-taggatose, D-talose, 2-deoxy-D-glucose, D-fucose, L-fucose, D-fructose, D-mannose, L-rhamnose, D-inositol, myo-inositol, D-glucitol, D-mannitol, methyl=D-galactopyranoside, methyl=D-glucopyranoside, methyl=D-mannopyranoside, N-acetyl chitobiose, isomaltose, xylobiose, gentiobiose, kojibiose, chondrosine, sucrose, cellobiose, sophorose, $\alpha,\alpha$-trehalose, maltose, melibiose, lactose, laminaribiose, rutinose, gentianose, stachyose, cellotriose, planteose, maltotriose, melezitose, lacto-N-tetraose, raffinose or the like can be exemplified.

When the solid moisturizing agent is added, it is preferable to add the solid moisturizing agent in an amount of 80 mass % or less with respect to the total mass of water, from a viewpoint of preventing the agent from being precipitated prior to the freezing of water, when the apparatus is cooled.

As the pH adjuster, for example, potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, sodium hydrogen carbonate or the like can be exemplified.

As the preservative and the fungicide, for example, sodium benzoate, pentachlorophenol sodium, 2-pyridinethiol-1-oxide sodium, sodium sorbate, sodium dehydroacetate, and 1,2-dibenzothiazoline-3-one can be exemplified. As a commercially available product, PROXEL XL2, PROXEL GXL (all of the above are trade names, manufactured by Avecia), Denicide CSA, NS-500W (all of the above are trade names, manufactured by Nagase ChemteX Corporation) or the like can be exemplified.

As the rust-preventative agent, for example, benzotriazole can be exemplified. In addition, as the chelating agent, for example, ethylenediaminetetraacetic acid and salts thereof (ethylenediaminetetraacetic acid dihydrogen disodium salt or the like), (S,S)-ethylenediamine disuccinic acid and salts thereof, dicarboxymethyl glutamic acid and salts thereof, iminodisuccinic acid and salts thereof (iminodisuccinic acid tetrasodium) or the like can be exemplified.

As the dye, it is possible to use a dye generally used for ink jet recording without any particular limitation.

1.3 Operational Effect

The ink jet recording apparatus of the embodiment includes the ink described above, and the discharge head described above. The capacity of the pressure chamber of the discharge head is $10.0 \times 10^6$ μm$^3$ or less, the density in which the plurality of nozzle holes are arranged in the nozzle plate is 200 dpi or more, and the ink jet recording apparatus includes a highly dense and miniaturized discharge head. However, since the ink jet recording apparatus uses an ink in which a ratio of the organic solvent to water described above is 0.2 to 0.5, and a solid content of the resin component is 1.5 mass % or more, damage to the discharge head caused by the freezing of the ink hardly occurs even when the apparatus is placed in a low temperature environment.

In other words, in such ink jet recording apparatus, at least a part of volume expansion caused by solidification of water in a case where the apparatus is placed in a low temperature environment is offset by volume contraction of the organic solvent, a rigid solid (ice) is hardly generated by the presence of the resin component, and a sherbet-shaped (ice cream-shaped) solid is generated. According to this, it is possible to reduce stress which may damage the vibration plate or piezoelectric element of the discharge head.

2. Examples, Comparative Examples and Reference Examples

Hereinafter, Examples, Comparative Examples and Reference Examples are illustrated, and the invention is further described. However, the invention is not limited at all by the following examples.

2.1 Adjustment of Ink

Materials shown in Table 1 were put into a container, mixed and stirred for 2 hours by a magnetic stirrer. After that, impurities such as wastes or coarse particles were removed by filtering the mixture by a membrane filter having a pore diameter of 5 µm, thereby preparing each ink used for Examples, Comparative Examples and Reference Examples. In addition, numerical values in Table 1 show mass %, and water (ion exchange water) was added such that the total mass of the ink is 100 mass %.

In addition, in Table 1, as the resin solid content, the total amount of the dispersion resin (styrene-acrylic acid copolymer-based resin) and the fixing resin (urethane resin), the total amount of the organic solvent, a ratio of the mass of the organic solvent to the mass of water (organic solvent/water), and a theoretical value of volume expansion coefficient of the entire ink when the ink is frozen are written in combination.

2.2 Evaluation Test

A plurality of ink jet recording apparatuses having different discharge heads were prepared. Each discharge head included in each of the ink jet recording apparatuses is referred to as a head A, a head B, a head C, respectively.

In the head A, a nozzle arrangement density is 300 dpi, and the capacity of the pressure chamber is $2.9 \times 10^6$ µm$^3$.

In the head B, a nozzle arrangement density is 360 dpi, and the capacity of the pressure chamber is $3.7 \times 10^6$ µm$^3$.

In the head C, a nozzle arrangement density is 180 dpi, and the capacity of the pressure chamber is $14.4 \times 10^6$ µm$^3$.

In addition, as shown in Table 2, the ink jet recording apparatus including the predetermined discharge head was filled with the ink shown in Table 1 to be capable of printing, and the entire ink jet recording apparatus was placed in a freezing room of which the temperature was set to −20° C. After 5 days passed, the ink jet recording apparatus was taken out of the freezing room, and returned to room temperature environment. After that, a printing evaluation was performed, in a case where image disturbance and dot omission occurred, the head was taken out of the ink jet

TABLE 1

|  | Ink 1 | Ink 2 | Ink 3 | Ink 4 | Ink 5 | Ink 6 | Ink 7 | Ink 8 | Ink 9 | Ink 10 |
| --- | --- | --- | --- | --- | --- | --- | --- | --- | --- | --- |
| M pigment solid content | 5.0 | | | | | | | | | |
| C pigment solid content | | 0.3 | 0.1 | 0.0 | | 1.0 | | | | |
| K1 pigment solid content (dispersion resin blending) | | 2.2 | 0.7 | 0.2 | 0.1 | | | 0.1 | | |
| K2 pigment solid content (self dispersion) | | | | | | | 6.0 | | 6.0 | 8.0 |
| Total resin solid content | 1.5 | 3.2 | 3.2 | 4.8 | 4.0 | 1.5 | 2.0 | 1.5 | 0.5 | 0.5 |
| Glycerin | 10.0 | 10.0 | 10.0 | 10.0 | 12.0 | 10.0 | 10.0 | 10.0 | 10.0 | 6.0 |
| 1,2-hexanediol | 4.0 | 5.0 | 5.0 | 6.0 | 3.9 | 5.0 | 3.0 | 3.9 | 2.5 | |
| 2-pyrrolidone | 3.0 | | | | | 5.0 | 6.0 | | 6.0 | 5.0 |
| Triethylene glycol | 10.0 | 12.4 | 11.7 | 4.0 | | 12.5 | 7.0 | | | 7.0 |
| TEGmBE | | | | | | | | | | 2.0 |
| Olfine E1010 | | | | | | | | 1.0 | | 1.0 |
| AMINOCOAT | | | | | | | | | | 11.0 |
| Water | 66.5 | 66.9 | 69.3 | 75.0 | 80.0 | 65.0 | 65.0 | 84.5 | 75.0 | 59.5 |
| Total organic solvent | 27.0 | 27.4 | 26.7 | 20.0 | 15.9 | 32.5 | 27.0 | 13.9 | 18.5 | 32.0 |
| Total amount | 100 | 100 | 100 | 100 | 100 | 100 | 100 | 100 | 100 | 100 |
| (organic solvent/water) ratio | 0.406 | 0.410 | 0.385 | 0.267 | 0.199 | 0.500 | 0.415 | 0.164 | 0.247 | 0.538 |
| Volume expansion coefficient due to freeze of ink | 3.95% | 3.95% | 4.26% | 5.50% | 6.41% | 3.25% | 3.80% | 7.06% | 5.65% | 2.75% |

Each of the materials shown in Table 1 is as follows.
(Coloring Material)
Magenta(M) pigment (C.I. Pigment violet 19 (Quinacridone)) (including "JONCRYL 538J" as the dispersion resin)
Cyan(C) pigment (C.I. Pigment blue 15:3) (including "JONCRYL 538J" as the dispersion resin)
Black(K1) pigment (Carbon black (C.I. Pigment black 7)) (including "JONCRYL 538J" as the dispersion resin)
Black(K2) pigment (Carbon black (C.I. Pigment black 7)) (a self dispersion type)
(Dispersion resin)
Styrene-acrylic acid copolymer-based resin (trade name "JONCRYL 538J", manufactured by BASF Japan Ltd., emulsion, Tg: 66° C.)
(Fixing resin)
Urethane resin (trade name "M-1064", manufactured by DKS Co., Ltd)
(Alkyl polyols)
1,2-hexanediol (normal boiling point: 224° C., logP value: 0.50)
Glycerin (normal boiling point: 290° C., logP value: −2.70)
(Pyrrolidone derivatives)
2-pyrrolidone
(Surfactant)
Olfine E1010 (acetylene glycol-based surfactant)
(Others)
TEGmBE: triethylene glycol monobutyl ether
AMINOCOAT: trimethylglycine (Asahi Kasei Chemicals Corporation)

recording apparatus, and it was observed whether the piezoelectric actuator was damaged or not with a microscope.

As a result of the observation, in a case in which image disturbance and dot omission did not occur and the piezoelectric actuator was not damaged is indicated by A, and in a case in which cracks or the like occurred in the piezoelectric actuator is indicated by B, and the result is shown in Table 2.

TABLE 2

|  | Examples | | | | | | | Comparative Examples | | | Reference Examples | |
|---|---|---|---|---|---|---|---|---|---|---|---|---|
|  | 1 | 2 | 3 | 4 | 5 | 6 | 7 | 1 | 2 | 3 | 1 | 2 |
| Ink type (refer to Table 1) | 1 | 2 | 3 | 4 | 5 | 6 | 7 | 8 | 9 | 4 | 9 | 10 |
| Head A | A | A | A | A | A | A | A | A | A |  |  | A |
| Head B |  |  |  |  |  |  |  |  |  |  | A |  |
| Head C |  |  |  |  |  |  |  |  |  | A |  |  |
| Whether piezoelectric actuator is damaged or not | A | A | A | A | A | A | A | B | B | B | A | A |

2.3 Evaluation Result

When Table 2 is referred to, in Examples 1 to 7, with regard to the head A, it is determined that the discharge head was not damaged, in a case where a composition ratio of the ink (organic solvent/water) was 0.2 to 0.5, and a solid content of the resin component in the ink was 1.5 mass % or more. In contrast to this, in Comparative Example 1, a composition ratio of the ink (organic solvent/water) was 0.2 or less, and the discharge head was damaged. It is considered that this is because the volume expansion amount of water caused by the freezing is greater than the volume contraction amount of organic solvent. In addition, in Comparative Example 2, a solid content of the resin component in the ink was less than 1.5 mass %, and the discharge head was damaged. It is considered that this is because a part of the volume expansion amount of water caused by the freezing is offset by the volume contraction amount of organic solvent, and the entire volume expansion amount is suppressed, but since the amount of the resin component is small, water crystals are big and/or strength of the crystals is increased, and thus the piezoelectric actuator is damaged.

Further, in Comparative Example 3, although a composition ratio of the ink (organic solvent/water) was 0.2 to 0.5, and a solid content of the resin component in the ink was 1.5 mass % or more, the discharge head was damaged. It is considered that this is because the capacity of the pressure chamber of the head C used exceeds $10 \times 10^6$ μm$^3$, and thus the entire volume expansion amount is not completely suppressed, even if the volume expansion amount of water caused by the freezing is offset by the volume contraction amount of organic solvent.

Meanwhile, Reference Example 1 is a combination of the head B and the ink 9. Although a composition ratio of the ink (organic solvent/water) was 0.2 or less, and a solid content of the resin component in the ink was less than 1.5 mass %, the discharge head was not damaged. A structure of the head B was as illustrated in FIG. 4, in which the ink of the head B started to become frozen from a nozzle, next the pressure chamber became frozen, and the freezing stopped in the ink supply chamber. However, it is considered that since the pressure caused by the ink expansion at the time of freezing can escape to an upstream side of the channel, the pressure chamber having low strength is not damaged.

In addition, Reference Example 2 is a combination of the head A and the ink 10 (well known). Although a solid content of the resin component in the ink was less than 1.5 mass %, the discharge head was not damaged. In other words, from Reference Example 2, it is understood that if an ink having a high solvent ratio is used, the piezoelectric actuator is not damaged even when the head A is used.

The invention is not limited to the embodiment described above, and can be modified in various ways. For example, the invention includes the configuration (for example, a configuration having the same function, method, and result, or a configuration having the same purpose and effect) substantially the same as the configuration described in the embodiment. In addition, the invention includes a configuration of which a nonessential portion of the configuration described in the embodiment is substituted. In addition, the invention includes a configuration having the same operational effect as the configuration described in the embodiment, or a configuration which can achieve the same purpose as the configuration described in the embodiment. In addition, the invention includes a configuration in which a well known technology is added to the configuration described in the embodiment.

The entire disclosure of Japanese Patent Application No. 2014-164170, filed Aug. 12, 2014 is expressly incorporated by reference herein.

What is claimed is:

1. An ink jet recording apparatus comprising:
    an ink; and
    a discharge head that discharges the ink,
    wherein the discharge head includes a plurality of pressure chambers respectively communicating with a plurality of nozzle holes formed in a nozzle plate, a vibration plate changing the capacity of each of the plurality of pressure chambers, and an ink supply chamber for supplying the ink to the plurality of pressure chambers, the capacity of the pressure chamber is $10.0 \times 10^6$ μm$^3$ or less, and the density in which the plurality of nozzle holes are arranged in the nozzle plate is 200 dpi or more, and
    wherein the ink includes a pigment, water, an organic solvent, and a resin component, an amount of the organic solvent being at least 27 mass %, a ratio (organic solvent/water) of a mass of the organic solvent to a mass of the water in the ink is 0.2 to 0.5, and a solid content of the resin component in the ink is 1.5 mass % or more.

2. The ink jet recording apparatus according to claim 1, wherein when the ink jet recording apparatus is cooled, and the ink is frozen, an ink of the nozzle plate side is preferentially frozen to the ink of the vibration plate side within the pressure chamber.

3. The ink jet recording apparatus according to claim 1, wherein the pressure chamber and the vibration plate is not substantially in contact with the air outside.

4. The ink jet recording apparatus according to claim 1, wherein the pigment is dispersed using a resin dispersant, and the resin component includes the resin dispersant.

5. The ink jet recording apparatus according to claim 1, wherein Young's modulus of a material configuring the vibration plate is 250 Gpa or less.

6. The ink jet recording apparatus according to claim 1, wherein the ink includes a resin emulsion as the resin component.

7. The ink jet recording apparatus according to claim 1, wherein a flexible and elastic film is included in a portion of a wall surface of the ink supply chamber.

8. The ink jet recording apparatus according to claim 1, wherein a volume expansion coefficient of the ink in a case where the ink is frozen under a temperature condition of −20° C. is 3.3% to 6.4%.

9. The ink jet recording apparatus according to claim 1, wherein the resin component includes a resin having Tg of 80° C. or less.

10. The ink jet recording apparatus according to claim 1, wherein the organic solvent includes a pyrrolidone derivative.

11. The ink jet recording apparatus according to claim 10, wherein the organic solvent includes a lactone.

12. The ink jet recording apparatus according to claim 11, wherein the organic solvent includes a 1,2-alkanediol, a polyalcohol, and a glycol ether.

* * * * *